(12) United States Patent
Goldstein

(10) Patent No.: US 10,752,468 B2
(45) Date of Patent: Aug. 25, 2020

(54) REGENERATIVE POWER CAPTURE SYSTEM FOR ENDLESS TRACK ESCALATORS AND MOVING WALKWAYS

(71) Applicant: GOLDSTEIN BIOMEDICAL CONSULTANTS LLC, Randolph, NJ (US)

(72) Inventor: Harold A. Goldstein, Randolph, NJ (US)

(73) Assignee: GOLDSTEIN BIOMEDICAL CONSULTANTS LLC, Randolph, NJ (US)

(*) Notice: Subject to any disclaimer, the term of this patent is extended or adjusted under 35 U.S.C. 154(b) by 149 days.

(21) Appl. No.: 16/005,813

(22) Filed: Jun. 12, 2018

(65) Prior Publication Data

US 2018/0297819 A1   Oct. 18, 2018

Related U.S. Application Data

(63) Continuation of application No. 15/138,888, filed on Apr. 26, 2016, now Pat. No. 10,017,360, which is a continuation of application No. 14/289,774, filed on May 29, 2014, now Pat. No. 9,346,654.

(51) Int. Cl.
| | | |
|---|---|---|
| G06F 7/00 | (2006.01) | |
| B66B 23/00 | (2006.01) | |
| B66B 23/12 | (2006.01) | |
| B66B 27/00 | (2006.01) | |
| B66B 23/02 | (2006.01) | |

(Continued)

(52) U.S. Cl.
CPC .............. *B66B 23/00* (2013.01); *B66B 23/02* (2013.01); *B66B 23/12* (2013.01); *B66B 25/003* (2013.01); *B66B 25/006* (2013.01); *B66B 27/00* (2013.01); *B66B 31/00* (2013.01); *Y02B 50/24* (2013.01)

(58) Field of Classification Search
None
See application file for complete search history.

(56) References Cited

U.S. PATENT DOCUMENTS

| | | |
|---|---|---|
| 7,155,849 B2 | 1/2007 | Hinterkeuser |
| 2004/0134107 A1 | 7/2004 | Hinterkeuser |
| 2011/0011700 A1 | 1/2011 | Plathin et al. |

(Continued)

FOREIGN PATENT DOCUMENTS

| | | |
|---|---|---|
| CN | 101952190 A | 1/2011 |
| CN | 103237751 A | 8/2013 |

(Continued)

*Primary Examiner* — Yolanda R Cumbess
(74) *Attorney, Agent, or Firm* — Hoffmann & Baron, LLP

(57) ABSTRACT

Power is recovered from an escalator or a moving walkway as the step orbits an endless track on rollers. A generator is connected to a roller orbiting the track. A battery backup is provided. The power is used for emergency lighting on the step, and for data transmission. Advertising and messages are displayed on a dynamic video screen mounted on the step. The apparatus is mostly contained within the escalator step. Information is communicated wirelessly to a remotely located central control station and back to the step, so as to display information in real time and to update advertising while the escalator is in operation. The central control station also monitors performance parameters. The visual display can include LED lighting.

16 Claims, 7 Drawing Sheets

(51) Int. Cl.
*B66B 25/00* (2006.01)
*B66B 31/00* (2006.01)

(56) References Cited

U.S. PATENT DOCUMENTS

| | | |
|---|---|---|
| 2013/0140134 A1 | 6/2013 | Senger et al. |
| 2013/0153362 A1 | 6/2013 | Gonzalez Alemany et al. |
| 2013/0270061 A1* | 10/2013 | Ma .................. B66B 25/003 198/330 |

FOREIGN PATENT DOCUMENTS

| | | | |
|---|---|---|---|
| EP | 1 634 843 | A2 | 3/2006 |
| EP | 2 716 589 | A2 | 4/2014 |
| JP | H07 133088 | A | 5/1995 |
| JP | H11 209056 | A | 8/1999 |
| JP | 2012166865 | A * | 9/2012 |
| JP | 2012166865 | A | 9/2012 |

* cited by examiner

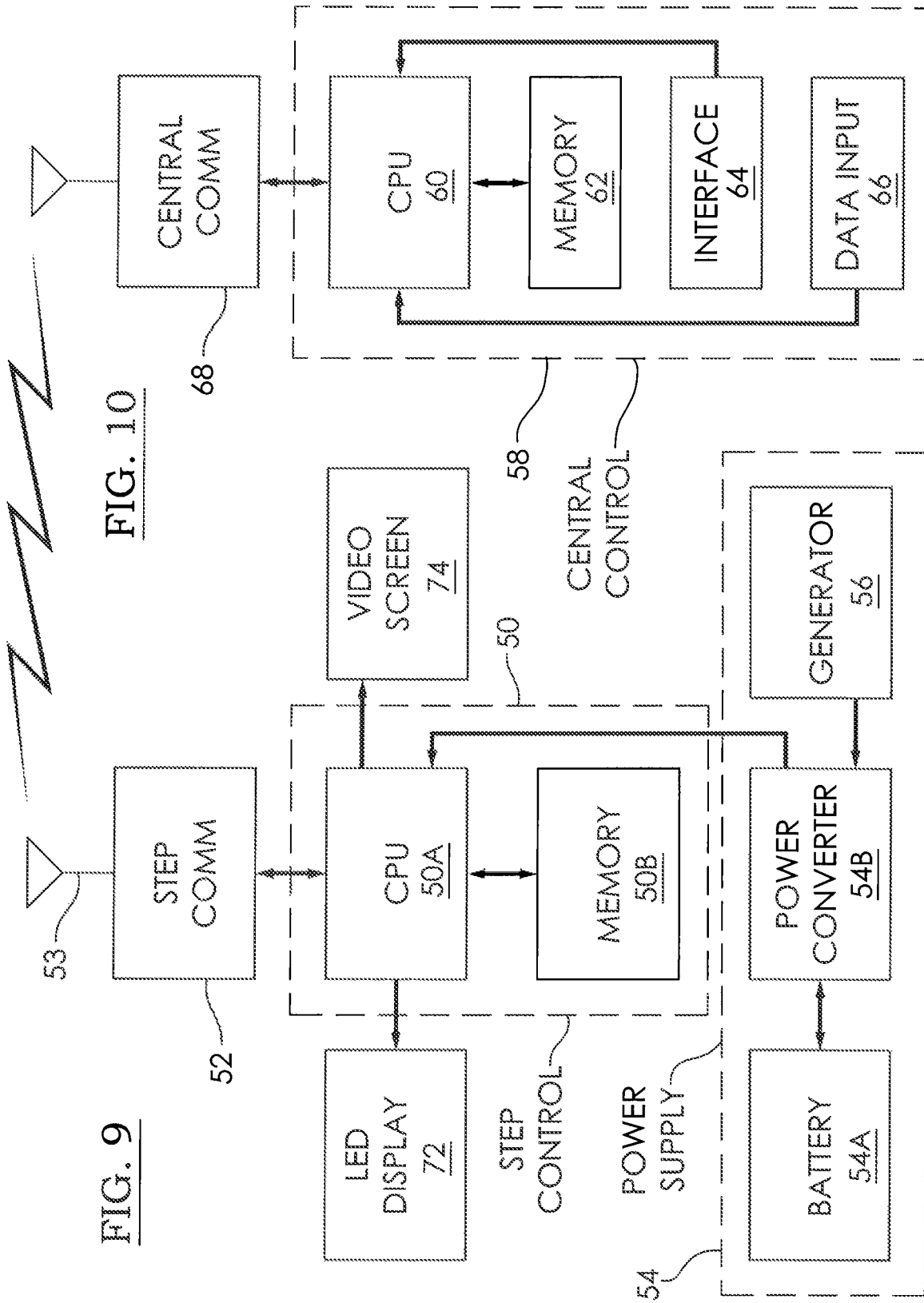

REGENERATIVE POWER CAPTURE SYSTEM FOR ENDLESS TRACK ESCALATORS AND MOVING WALKWAYS

CROSS-REFERENCE TO RELATED APPLICATIONS

This application is a continuation of U.S. Ser. No. 15/138,888, filed Apr. 26, 2016, which in turn is a continuation of U.S. Ser. No. 14/289,774, filed May 29, 2014, now U.S. Pat. No. 9,346,654, the entire contents of which are incorporated by reference herein.

TECHNICAL FIELD

The presently disclosed technologies are directed to an apparatus and method for harnessing the drive power of escalators for auxiliary uses, and more specifically, for regeneratively capturing some of the drive power of escalators and moving walkways to power communications, safety displays, and advertising on board the steps as the escalator is operating.

BACKGROUND

An escalator is an inherently dangerous machine. In the United States alone, approximately 12,000 accidents occur annually. Many of these incidents could be avoided with improved safety displays and warnings.

An escalator is also an ideal venue for advertising to riders who are temporarily unoccupied and undistracted by store displays. The message, whether for safety or for marketing, must be easily viewable by an observer on the escalator or the floor.

An escalator must be shut down periodically for preventive maintenance. If a component fails during operation, the machine must be stopped, which is an inconvenience. In a busy retail center, the escalator would be unavailable to elderly and handicapped people. There may also be safety and liability implications.

Accordingly, there is a need for an apparatus capable of displaying indicia and video messages on a moving escalator or walkway.

There is a further need for an apparatus of the type described, and that can provide monitoring of important technical parameters to warn of impending failure.

There is a yet further need for an apparatus of the type described, and that can recover regenerative power from the moving steps for the messages and monitoring.

The present invention is directed toward fulfilling the above-mentioned needs, as well as other needs, and overcoming various disadvantages known in the art.

SUMMARY

In one aspect, a regenerative power capture system is provided for endless track escalators and moving walkways. The system comprises a step having a tread extending generally horizontally from a front edge to an opposite rear edge. The step extends between opposite right and left ends. The step is adapted for orbital mounting on the track. A plurality of rollers is attached to the step. The rollers are mounted for movement on the track, and are for supporting the step on the track.

A step control is disposed on the step, for processing data. A power supply is mounted on the step and operatively electrically connected to the step control, for supplying electrical power.

A central control is located remotely from the step, for programming data to be transferred. A step communicator is operatively electrically connected to the step control for data transfer. A central communicator is operatively electrically connected to the central control for data transfer with the step communicator.

In another aspect, a method is disclosed for regeneratively capturing power for endless track escalators and moving walkways. The escalators and moving walkways have a plurality of steps mounted for orbital motion on the track. Each step has a tread, and a plurality of rollers. The method comprises disposing a step control on each step, for processing data. Electrical power is supplied operatively electrically to the step control with a power supply.

A central control is located remotely from the step. The central control is used for programming data. A step communicator is connected operatively electrically to the step control. A central communicator is connected operatively electrically to the central control. Data is transferred between the central communicator and the step communicator.

These and other aspects and advantages of the disclosed technologies will become apparent from the following detailed description of illustrative embodiments thereof, which is to be read in connection with the accompanying drawings.

BRIEF DESCRIPTION OF THE DRAWINGS

FIG. 9 is a schematic block diagram of the step control for the regenerative power capture system of FIG. 1.

FIG. 10 is a schematic block diagram of the central control for the regenerative power capture system of FIG. 1.

Figure 1:
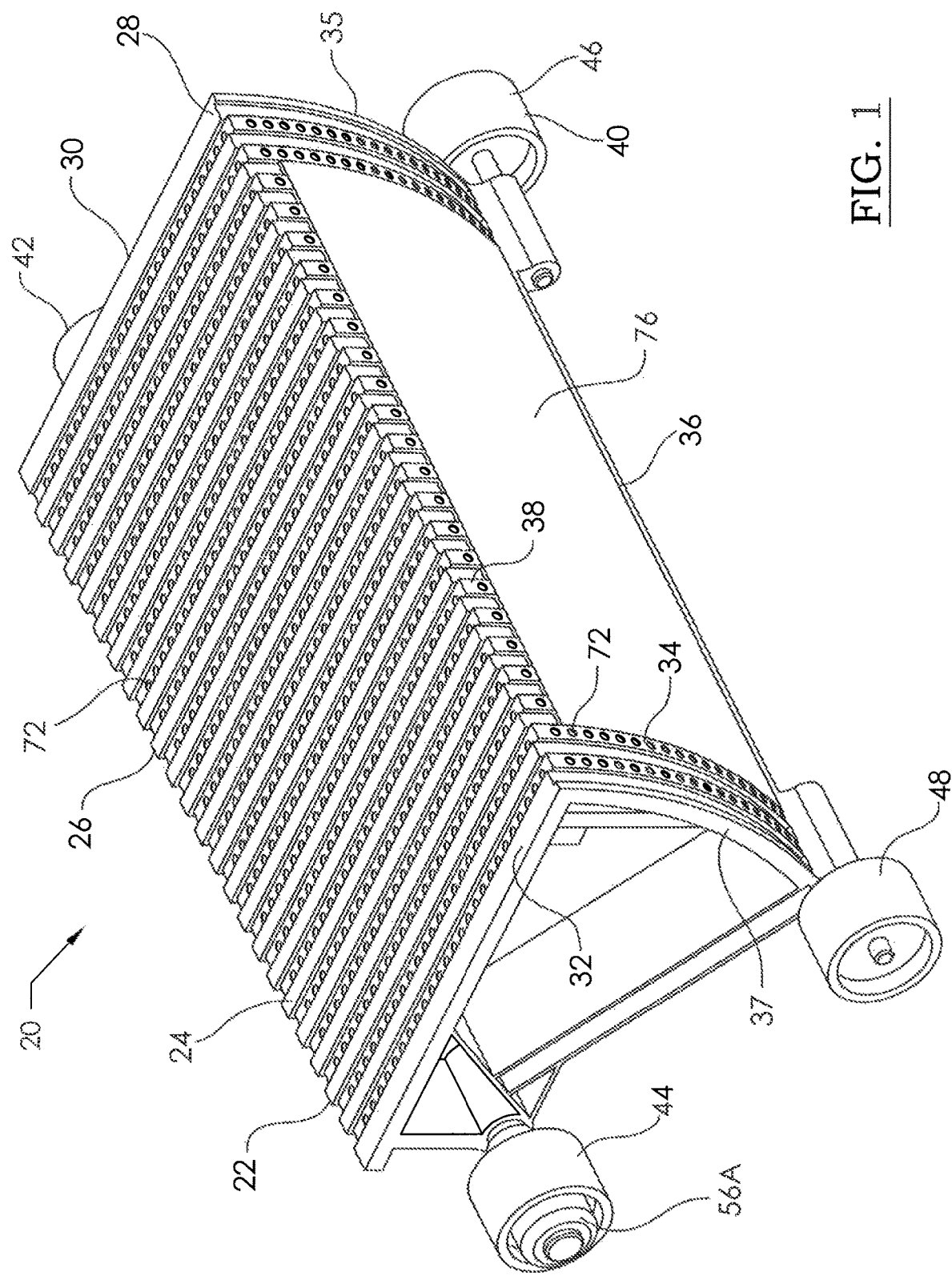
FIG. 1 is a top front perspective view of an exemplary step for a regenerative power capture system constructed in accordance with the invention.

It should be noted that the drawings herein are not to scale.

DETAILED DESCRIPTION

Describing now in further detail these exemplary embodiments with reference to the Figures as described above, a regenerative power capture system 20 is for use in connection with endless track escalators and moving walkways. The system 20 comprises a plurality of steps, each step 22 having a tread 24 extending generally horizontally from a front edge 26 to an opposite rear edge 28. The step 22 extends between opposite right 30 and left 32 ends. In the case of an escalator, the step 22 has a riser 34 extending upward from a lower edge 36 to an opposite upper edge 38. The riser 34 extends between opposite right 35 and left 37 ends. The tread rear 28 is adjacent the riser upper edge 38. The step 22 is adapted for orbital mounting on the track (not shown). In the case of a moving walkway, the step has no riser but is structurally similar, and is mounted for orbital motion on a track.

A plurality of rollers 40 is rotatably attached to the plurality of steps 22 and mounted for rolling movement on the track. The rollers 40 are for supporting the step 22 on the track. Specifically, a right leading roller 42 and a left leading roller 44 are mounted for rotation adjacent the tread front edge right end 30 and left end 32, respectively. Similarly, a right trailing roller 46 and a left trailing roller 48 are mounted for rotation adjacent the riser lower edge right end 35 and left end 37, respectively. Each roller 40 has typically two bearings for mounting the roller rotatably to the step. The bearings are not shown because they are internally mounted, a configuration known to those of ordinary skill in the art.

A step control 50 is disposed on at least one of the plurality of steps 22 for processing data. The step control 50 is inside the housing 50. Details of the circuitry for the step control 50 are not shown, but are well known to those of ordinary skill in the art. The step control 50 includes a central processor unit 50A and a memory 50B inside the housing 50. Details of the circuitry for the central processor unit 50A and memory 50B are not shown, but are well known to those of ordinary skill in the art. A step communicator 52 inside the housing 50 is operatively electrically connected to the step control 50 for data transfer. Details of the circuitry for the step communicator 52 are not shown, but are well known to those of ordinary skill in the art. The step communicator 52 is wireless, and typically is an RF transceiver. An antenna 53 is provided for the step communicator 52. Alternate means for communicating data can be employed, such as for example infrared or microwave.

A power supply 54 is mounted on at least one of the plurality of steps 22 for supplying electrical power. The power supply 54 has at least one electrical generator 56 operatively connected to at least one of the rollers 40. The generator 56 generates electrical power as the step 22 orbits the track. The generator 56 is typically integral with the roller 40. Preferably, a first generator 56A is integral with a first roller, for example left leading roller 44, and a second generator 56B is integral with a second roller, for example right leading roller 42. Alternatively, the generator 56 can be external to the roller 40 and connected by shaft, belt, gears, or other means (not shown).

Another configuration would be to connect two collinear rollers to one generator. Yet another configuration would be to mount a fifth roller rotatably attached to the step 22 and mounted for rolling movement on the track. The fifth roller (not shown) would be dedicated to the generator. Still another configuration would be to connect several steps together with flexible wiring. Only one step need be equipped with a generator to power all the connected steps. The generator 56 has a connection 56C shown in FIG. 2. Wiring is not shown in the drawing Figures, but is well known to those of ordinary skill in the art.

The power supply 54 has a power converter 54B operatively electrically connected to the generator 56 for regulating power. The power supply 54 has a rechargeable battery 54A operatively electrically connected to the power converter 54B. The battery 54A is for backup power in the event of power failure, such as a generator malfunction. In this application, "operatively electrically connected," means either hard-wired or wireless. Alternatively, the power supply 54 can include a generator 56 but no battery.

A central control 58 is located remotely from the step 22, as for example in a room distant from the escalator. The central control 58 is for programming data to be transferred to and received from the step control 50. The central control 58 includes a central processor unit 60, a memory 62, an interface 64 which is typically a keyboard and a mouse and a monitor, and a data input unit 66. The data input unit 66 can be an optical drive for reading a DVD, or it can be a live feed from a television camera. The data input unit 66 can be any device capable of conveying data to the central control 58. A central communicator 68 is operatively electrically connected to the central control 58 and is used for data transfer with the step communicator 52. The central communicator 68 is wireless, and typically is an RF transceiver.

A visual display 70 is provided, and includes a plurality of LEDs 72 disposed in an LED array on the step 22 and connected to the step control 50. The LEDs 72 are typically for displaying data and for safety. The LEDs 72 can also be used for purely aesthetic display, with no particular message. The data can include text spelled out, or other images, in a pattern of LED lamps. The text can convey messages regarding sales events, advertising, store location, public presentations, or other information. Safety uses include emergency instructions in the event of building power failure, or fire, and can inform observers of exit locations. Safety uses can also include illuminating the boundary of the escalator and the edges of the step tread, so that riders are less likely to trip.

In the case of an escalator, a visual display 70 can also include a digital video screen 74 mounted on the step 22 and juxtaposed with the riser 34 behind a transparent and rugged protective cover 76. The digital video screen 74 is connected to the step control 50 for displaying of data. Digital video data can include advertising with either static displays or dynamic motion picture commercials. Video data can also include messages or aesthetic presentations. Video data can be presented from a recorded source such as a DVD or tape recording fed into the central control data input unit 66. The recorded presentation can be programmed to repeat, or to switch to another recording. Video data can be from a live feed, such as a television camera (not shown) covering a live demonstration of cooking, fashion, sports, news, and the like.

Observers who are not riding the escalator, but are standing or walking on the floor near the lower landing will be able to observe the visual display 70. The same message can be displayed on every step. Alternatively, a different message can be displayed on every step. Another alternative is to spread a single message over several steps, for example three steps. In this embodiment, in a first mode, the message can move with the steps. In a second mode, the message can continuously transfer to the next upper or lower step as the steps move, so that the message appears to be generally stationary as the steps move downward or upward, respectively.

In the case of a moving walkway, a visual display 70 can also include a digital video screen mounted on the step 22 and juxtaposed with the tread 24 behind a transparent and rugged protective cover (not shown). As described above, the digital video screen is connected to the step control 50 for displaying of data. The visual display in this case would most likely not be used for advertising, but for safety illumination or for aesthetic displays.

The housing 50, which contains the step control 50 and step communicator 52, is attached to the front of mounting plate 55. The digital video screen 74 is attached to the rear of mounting plate 55, facing the riser 34.

Performance parameters can be fed back to the central control 58 to be monitored. Parameters of the step control can include CPU activity and memory use. The visual display 70 can be monitored for color, contrast, pixel failure, and many other graphic parameters. The power converter 54B, the battery 54A, and the generator 56 can be monitored for voltage, current, battery charge, and failure of any components. All performance parameters are constantly monitored. Any problem detected is telemetered back to the central control 58 and displayed.

Figure 2:
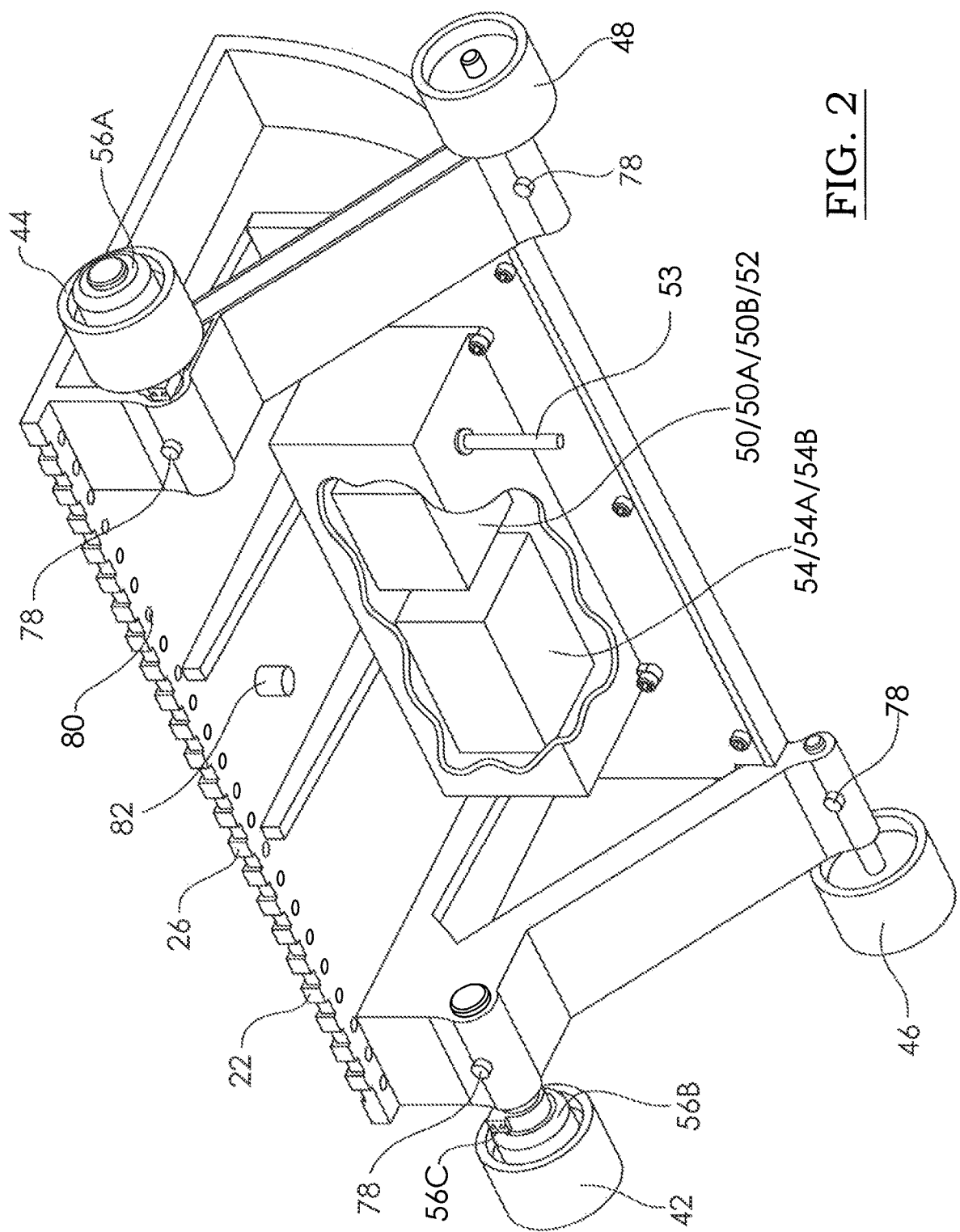
FIG. 2 is a bottom rear perspective view of the regenerative power capture system of FIG. 1.
Figure 3:
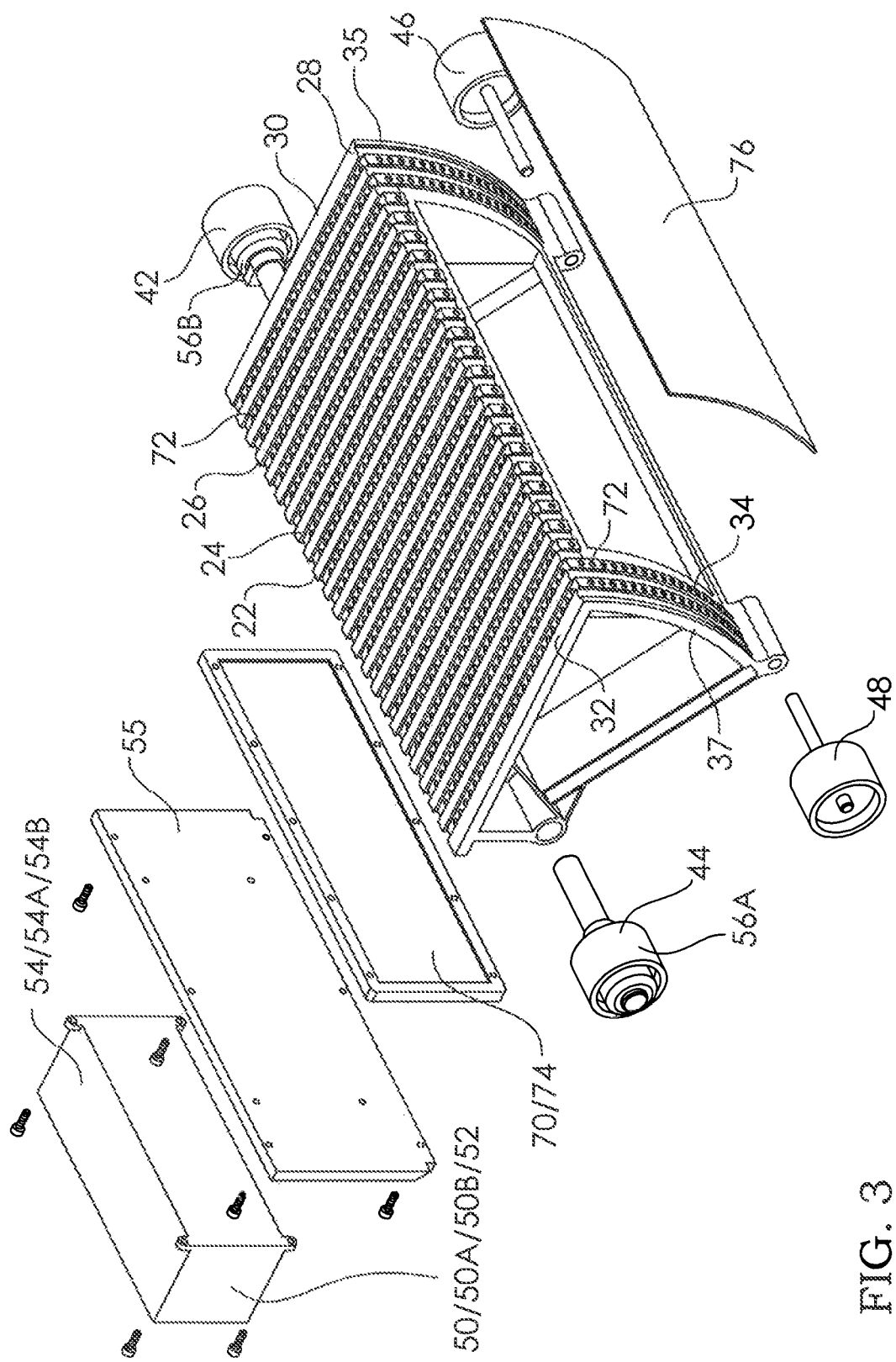
FIG. 3 is an exploded top front perspective view of the regenerative power capture system of FIG. 1.
Figure 4:
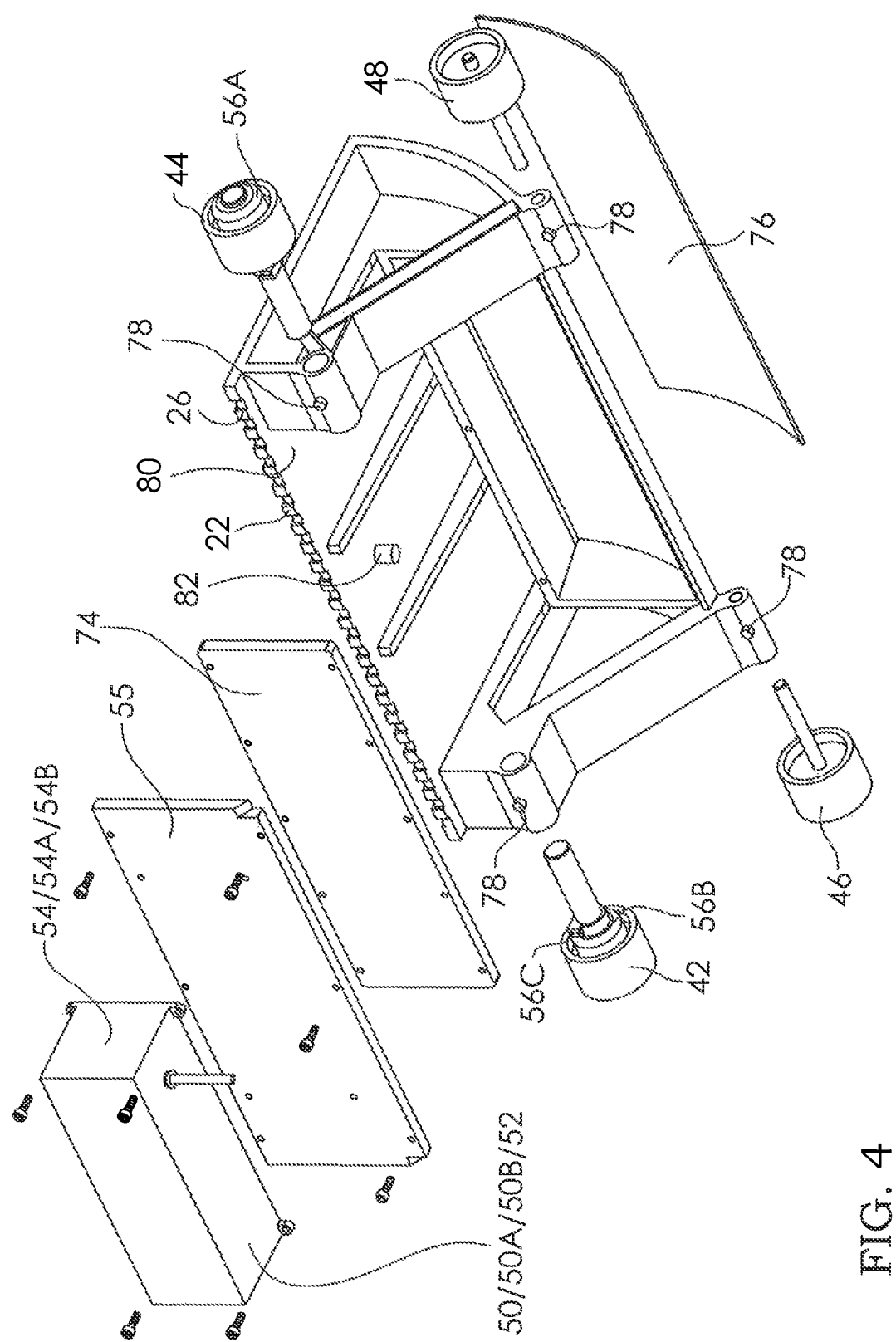
FIG. 4 is an exploded bottom rear perspective view of the regenerative power capture system of FIG. 1.
Figure 5:
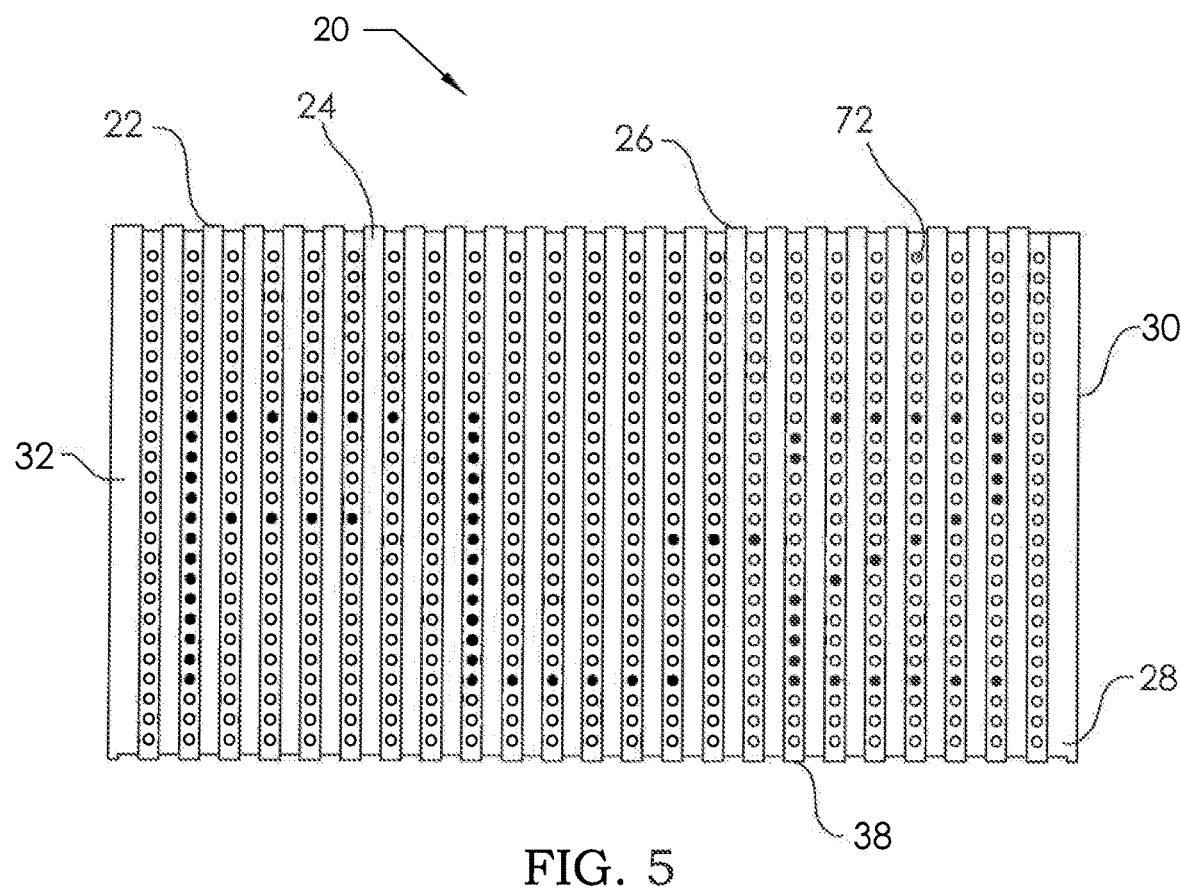
FIG. 5 is a top plan view of a tread for the regenerative power capture system of FIG. 1, showing an LED array displaying a message.
Figure 6:
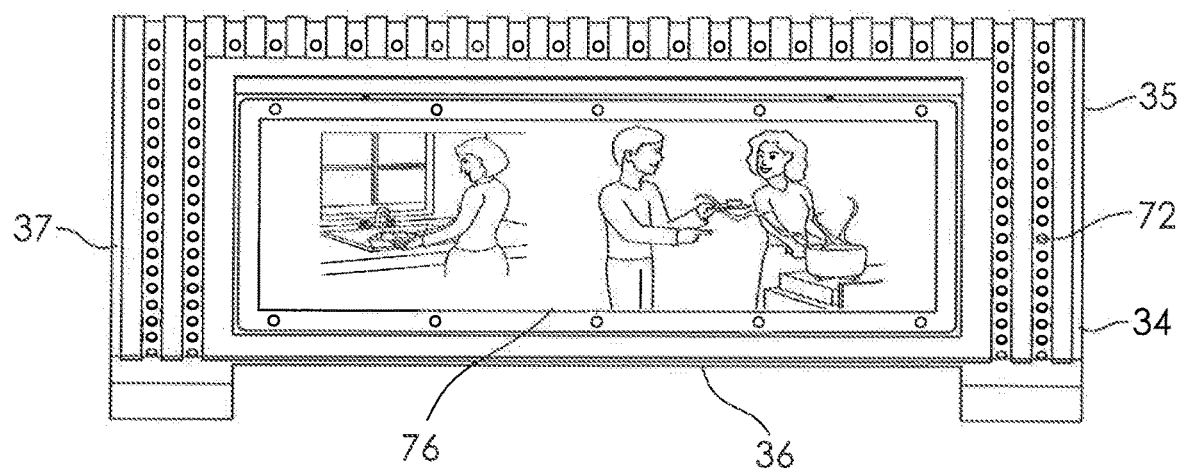
FIG. 6 is a front elevational view of the tread of FIG. 5, showing a video screen displaying a message
Figure 7:
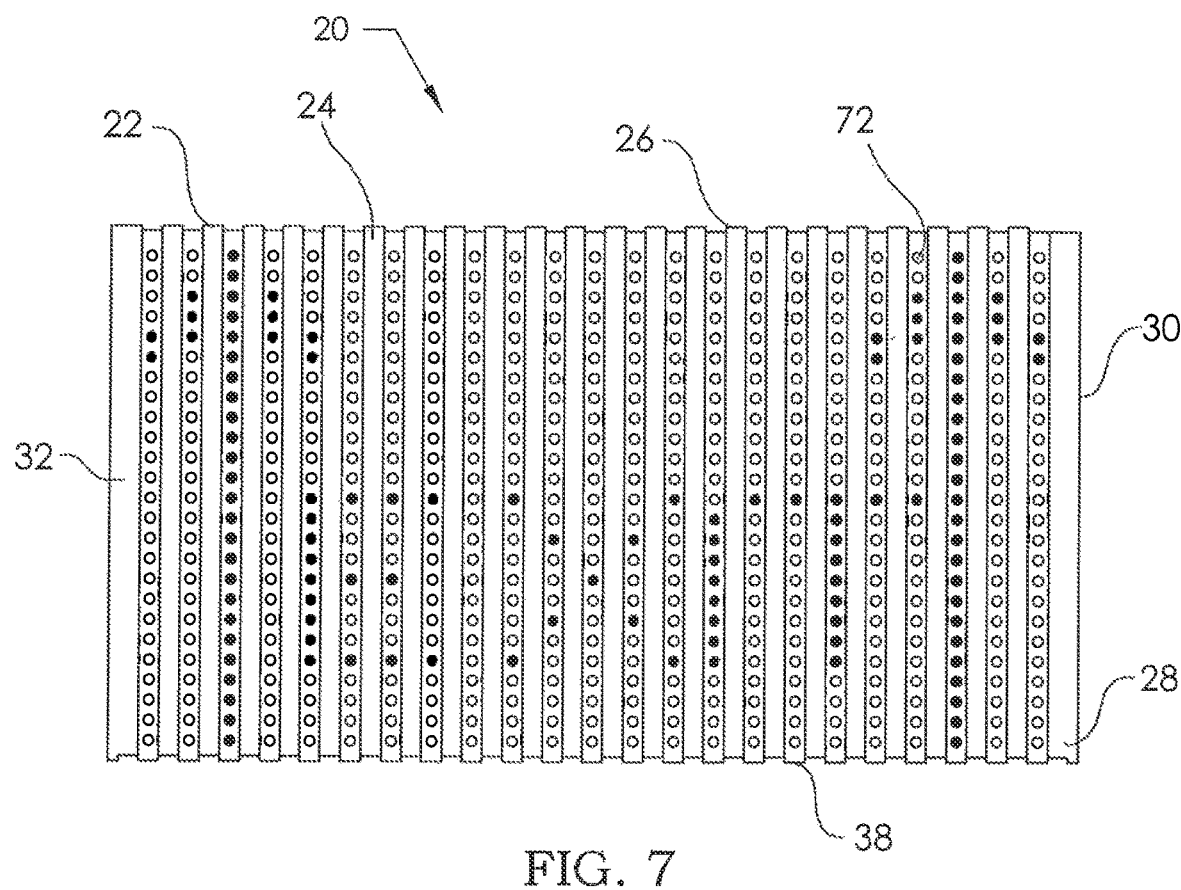
FIG. 7 is a top plan view of the tread of FIG. 5, showing the LED array displaying another message.
Figure 8:
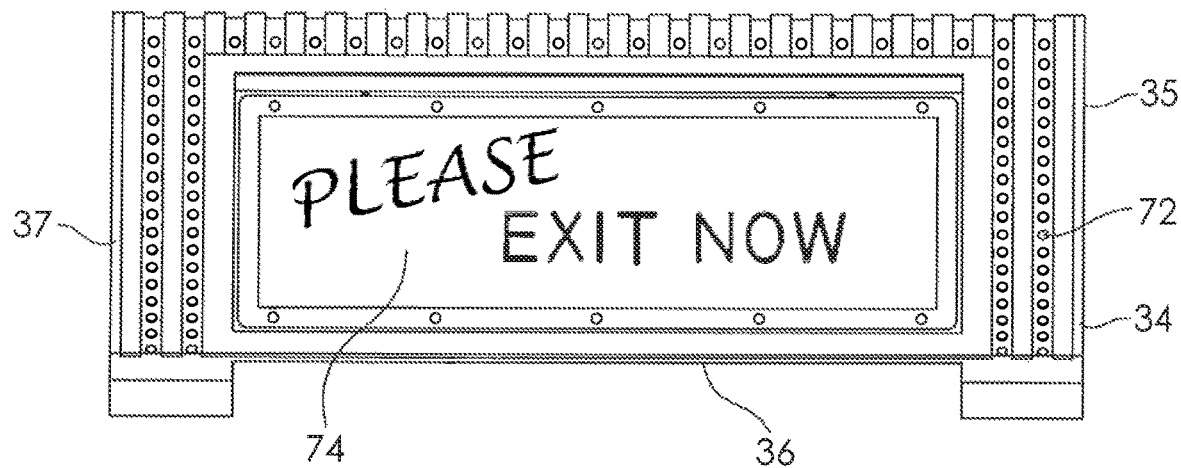
FIG. 8 is a front elevational view of the tread of FIG. 7, showing the video screen displaying another message.

The rollers 40 typically have two bearings (not shown) mounted internally. The function of the bearings for the rollers can also be monitored. Vibration sensors 78 mounted on the step 22 adjacent each bearing, as shown in FIG. 2, can detect abnormal vibrations that presage a bearing failure. Such a failure can result in a shutdown and expensive repair, and possibly can have safety implications for the riders. One possible mode would be to monitor each bearing for a predetermined time period, for example, 15 seconds. Each roller would then be checked once per minute. Each step would telemeter data on a separate channel. The bearings will exhibit a characteristic "signature" vibration of frequency, amplitude, and other parameters of normal operation. The monitored readings will be compared to normal values, and any deviation will suggest an impending failure. Corrective maintenance can then be carried out with little or no disruption of service.

Escalators typically utilize a comb (not shown) at the entrance and exit platforms. The comb is a serrated strip having projecting fingers that engage the grooves in the step. The step 22 of the invention includes a comb sensor 80 operatively electrically connected to the step control 50. The comb sensor 80 will detect operating conditions of a comb, such as for example, a shoelace caught in the fingers. The comb sensor 80 will detect malfunction of a comb, such as for example a broken finger or debris stuck between fingers. The comb sensor 80 typically will utilize a linear array of photo sensitive detectors 80 disposed between grooves underneath the front edge of each step. The detectors 80 respond to ambient light directed downward. The detector circuitry is timed to sense the light or absence of light as the detector array is juxtaposed with each comb. The combs are constantly monitored. Any problem detected is telemetered back to the central control and displayed. The comb sensor 80 can employ alternative sensors, for example, proximity sensors.

A vibrating transducer 82 can be attached to the underside of the step 22. The transducer is adapted for generating an acoustic signal. In one mode, the transducer 82 will vibrate the step 22 when approaching a landing platform to warn of the approaching landing. The vibration will travel through the rider's feet. This safety feature will warn riders to anticipate stepping off. In another mode, the transducer 82 will reproduce sound to accompany the video display. Typically, the sound from a particular step will be directed upward to be heard by the rider on that step.

A method is disclosed for regeneratively capturing power for endless track escalators and moving walkways. A plurality of steps 22 is mounted for orbital motion on the track. Each step 22 has a tread 24 and a plurality of rollers 40. The method comprises disposing a step control 50 on at least one of the plurality of steps, for processing data. Electrical power is supplied operatively electrically to the step control with a power supply 54. A step communicator 52 is operatively electrically connected to the step control 50.

A central control 58 is located remotely from the step 22, and is used to program data. A central communicator 68 is operatively electrically connected to the central control 58. Data is transferred between the central communicator 68 and the step communicator 52.

The method further comprises connecting an electrical generator 56 operatively to at least one of the rollers 40. Electrical power is generated with the generator 56 as the step orbits the track. A power converter 54B is operatively electrically connected to the generator 56 and the step control 50. Power is regulated with the power converter 54B. A battery 54A is operatively electrically connected to the power converter 54B for backing up power in the event of power failure. The generator 56 is integrated with the roller 40.

The step control 50 is provided with a central processor unit 50A and a memory 50B. The central control 58 is provided with a central processor unit 60, a memory 62, an interface 64, and a data input unit 66. Data is transferred wirelessly between the central communicator 68 and the step communicator 52. The central communicator 68 uses an RF signal for transmitting and receiving. The step communicator 52 also uses an RF signal for transmitting and receiving. Parameters of the step control 50; the power converter 54B; the battery 54A; and the generator 56 are monitored with the central control 58.

The method further comprises extending a riser 34 upward from a lower edge 36 of the step to an opposite upper edge 38. A visual display 70 including a digital video screen 74 is juxtaposed with the riser 34. The visual display 70 is operatively electrically connected to the step control 50 for displaying data.

Another aspect of the visual display 70 includes arraying a plurality of LEDs 72 on the step in an LED array. The LED array is operatively electrically connected to the step control. The LED array is for displaying data and safety lighting.

A comb sensor 80 is connected operatively electrically to the step control 50. The comb sensor 80 is used for detecting malfunction of a comb.

The method further comprises encoding the data so as to preclude hacking into the step control 50 and the central control 58.

A plurality of bearings is provided for mounting the rollers to the step. Vibration sensors 78 are provided adjacent each bearing. The vibration sensors 78 are connected to the step control 50. Bearing vibrations are detected with the vibration sensors. Vibration data is communicated to the central control, so as to predict a bearing failure.

A transducer 82 is mounted to the step 22. The transducer 82 is adapted for generating an acoustic signal. The transducer 82 vibrates the step 22 when approaching a landing, so as to warn riders of the approaching landing. The transducer 82 can also be used to reproduce sound to accompany the video display.

It will be appreciated that variants of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A regenerative power capture system for endless track escalators and moving walkways, the system comprising:
   a step having a tread extending generally horizontally from a front edge to an opposite rear edge, the step extending between opposite right and left ends, the step being adapted for orbital mounting on an endless track;

a plurality of rollers attached to the step and adapted for rolling movement on the track;

a step control connected to the step, for processing data;

a power supply connected to the step and operatively electrically connected to the step control, for supplying electrical power; and an acoustic transducer attached to the step and adapted for generating an acoustic signal, the acoustic transducer being operatively electrically connected to the step control for receiving acoustic signal commands.

2. The regenerative power capture system of claim 1, wherein the power supply further comprises:

an electrical generator operatively connected to at least one of the rollers, for generating electrical power as the step orbits the track;

a power converter operatively electrically connected to the generator for regulating electrical power; and a battery operatively electrically connected to the power converter for backup electrical power in the event of power failure, and wherein the generator is integral with the roller.

3. The regenerative power capture system of claim 1, further comprising:

a visual display including a plurality of LEDs disposed in an LED array connected to the step and operatively electrically connected to the step control and receiving commands from the step control; wherein the visual display is selected from the group consisting of data display, safety display, and aesthetic display.

4. The regenerative power capture system of claim 1, further comprising:

an electrical generator operatively connected to at least one of the rollers, for generating electrical power as the step orbits the track;

a power converter operatively electrically connected to the generator for regulating electrical power;

a battery operatively electrically connected to the power converter for backup electrical power in the event of power failure;

a visual display connected to the step for displaying data;

a central control located remotely from the step, the central control being adapted for exchanging data with the step control, the central control having a central processor unit, a memory, an interface, and a data input unit, the central control being adapted to monitor parameters of the step control, and the visual display, and the power converter, and the battery, and the generator, the central control being adapted for programming data to be transferred to the step control;

the step control includes a central processor unit and a memory;

a step communicator operatively electrically connected to the step control for data transfer, the step communicator being a wireless transceiver; and a central communicator operatively electrically connected to the central control for data transfer with the step communicator, the central communicator being a wireless transceiver.

5. The regenerative power capture system of claim 4, wherein the visual display further comprises a digital video screen connected to the step for displaying data and operatively electrically connected to the step control and receiving commands from the step control.

6. The regenerative power capture system of claim 4, further comprising:

the step includes a riser extending upward from a lower edge to an opposite upper edge, and the tread extends generally horizontally from a front edge to an opposite rear edge at the riser upper edge; and the visual display includes a digital video screen juxtaposed with the riser and operatively electrically connected to the step control for receiving commands from the step control; wherein the visual display is selected from the group consisting of data display, safety display, and aesthetic display.

7. The regenerative power capture system of claim 4, further comprising:

a plurality of bearings for mounting the rollers to the step; and vibration sensors adjacent each bearing for detecting vibrations so as to predict a bearing failure, the vibration sensors being operatively electrically connected to the step control for communicating hearing vibration data to the central control.

8. The regenerative power capture system of claim 4, further comprising a comb sensor connected to the step for detecting operating conditions of a comb, the comb sensor being operatively electrically connected to the step control for communicating comb data to the central control.

9. A regenerative power capture system for endless track escalators and moving walkways, the system comprising:

a step having a tread, the step being adapted for orbital mounting on an endless track;

a visual display connected to the step for displaying data;

a step control connected to the step, the step control having a central processor unit and a memory for processing data, the step control being adapted for sending data to the visual display;

a power supply connected to the step and operatively electrically connected to the step control, for supplying electrical power; and an acoustic transducer attached to the step and adapted for generating an acoustic signal, the acoustic transducer being operatively electrically connected to the step control for receiving acoustic signal commands.

10. The regenerative power capture system of claim 9, further comprising:

a central control located remotely from the step, the central control being adapted for exchanging data with the step control the central control having a central processor unit a memory, an interface, and a data input unit, the central control being adapted to monitor parameters of the step control, and the visual display, and power supply, the central control being adapted for programming data to be transferred to the step control;

a step communicator operatively electrically connected to the step control for data transfer, the step communicator being a wireless transceiver;

a central communicator operatively electrically connected to the central control for data transfer with the step communicator, the central communicator being a wireless transceiver; and the visual display includes a plurality of LEDs disposed in an LED array connected to the step and operatively electrically connected to the step control and receiving commands from the step control; wherein the visual display is selected from the group consisting of data display, safety display, and aesthetic display.

11. The regenerative power capture system of claim 9, further comprising:

a central control located remotely from the step, the central control being adapted for exchanging data with the step control, the central control having a central processor unit, a memory, an interface, and a data input unit, the central control being adapted to monitor parameters of the step control, and the visual display, and power supply, the central control being adapted for programming data to be transferred to the step control;

a step communicator operatively electrically connected to the step control for data transfer, the step communicator being a wireless transceiver;

a central communicator operatively electrically connected to the central control for data transfer with the step communicator, the central communicator being a wireless transceiver;

the step includes a riser extending upward from a lower edge to an opposite upper edge, and the tread extends generally horizontally from a front edge to an opposite rear edge at the riser upper edge; and the visual display includes a digital video screen juxtaposed with the riser and operatively electrically connected to the step control for receiving commands from the e control; wherein the visual display is selected from the group consisting of data display, safety display, and aesthetic display.

12. The regenerative power capture system of claim 9, further comprising:

a central control located remotely from the step, the central control being adapted for exchanging data with the step control, the central control having a central processor unit, a memory, an interface, and a data input unit, the central control being adapted to monitor parameters of the step control, and the visual display, and power supply, the central control being adapted for programming data to be transferred to the step control;

a step communicator operatively electrically connected to the step control for data transfer, the step communicator being a wireless transceiver;

a central communicator operatively electrically connected to the central control for data transfer with the step communicator, the central communicator being a wireless transceiver;

a plurality of bearings for mounting the rollers to the step; and vibration sensors adjacent each bearing for detecting vibrations so as to predict a bearing failure, the vibration sensors being operatively electrically connected to the step control for communicating bearing vibration data to the central control.

13. The regenerative power capture system of claim 9, further comprising:

a central control located remotely from the step, the central control being adapted for exchanging data with the step control the central control having a central processor unit a memory, an interface, and a data input unit, the central control being adapted to monitor parameters of the step control, and the visual display, and power supply, the central control being adapted for programming data to be transferred to the step control;

a step communicator operatively electrically connected to the step control for data transfer, the step communicator being a wireless transceiver; and a central communicator operatively electrically connected to the central control for data transfer with the step communicator, the central communicator being a wireless transceiver, wherein the step further comprises a comb sensor connected to the step and operatively electrically connected to the step control for detecting operating conditions of a comb.

14. A method for regeneratively capturing power for endless track escalators and moving walkways having a plurality of steps mounted for orbital motion on a track, each step having a tread, each step having a plurality of rollers, the method comprising:

connecting a step control to each step, for processing data;

supplying electrical power operatively electrically to the step control with a power supply;

locating a central control remotely from the step, and programming data with the central control;

connecting a step communicator operatively electrically to the step control;

connecting an acoustic transducer operatively electrically to the step control; and connecting a central communicator operatively electrically to the central control and transferring data between the central communicator and the step communicator.

15. The method of claim 14, wherein the supplying electrical power operatively electrically to the step control with a power supply further comprises:

connecting an electrical generator operatively to at least one of the rollers;

generating electrical power with the generator as the step orbits the track;

connecting a power converter operatively electrically to the generator and the step control;

regulating power with the power converter; and connecting a battery operatively electrically to the power converter for backing up power in the event of power failure.

16. The method of claim 15, further comprising integrating the generator with the roller.

* * * * *